US012006163B2

(12) United States Patent
Volmer et al.

(10) Patent No.: US 12,006,163 B2
(45) Date of Patent: Jun. 11, 2024

(54) GRIPPER TRUCK ASSEMBLY, MACHINING SYSTEM, AND METHOD OF MOVING A WORKPIECE WITH RESPECT TO A MACHINING STATION

(71) Applicant: Voortman Steel Machinery Holding B.V., Rijssen (NL)

(72) Inventors: Frans Herman Volmer, Deventer (NL); Han Hermannus Ter Horst, Nijverdal (NL)

(73) Assignee: VOORTMAN STEEL MACHINERY HOLDING B. V., Rijssen (NL)

( * ) Notice: Subject to any disclaimer, the term of this patent is extended or adjusted under 35 U.S.C. 154(b) by 28 days.

(21) Appl. No.: 17/856,424

(22) Filed: Jul. 1, 2022

(65) Prior Publication Data
US 2023/0002172 A1    Jan. 5, 2023

(30) Foreign Application Priority Data
Jul. 2, 2021   (NL)  ..................................... 2028614

(51) Int. Cl.
*B65G 47/90*       (2006.01)
*B23Q 7/04*        (2006.01)

(52) U.S. Cl.
CPC  ............. *B65G 47/90* (2013.01); *B23Q 7/046* (2013.01)

(58) Field of Classification Search
CPC .... B23Q 7/1405; B23Q 7/141; B23Q 7/1415; B23Q 7/046; B23Q 7/165; B23Q 7/05–08; B65G 47/90; B65G 47/901
(Continued)

(56) References Cited

U.S. PATENT DOCUMENTS

| | | | | |
|---|---|---|---|---|
| 2016/0107847 A1* | 4/2016 | Grünewald | .......... | B65G 47/902 72/422 |
| 2018/0111236 A1* | 4/2018 | Lan | ........................ | B23Q 7/047 |
| 2019/0315576 A1* | 10/2019 | Torrero | ................ | B25J 15/0061 |

FOREIGN PATENT DOCUMENTS

| | | | | |
|---|---|---|---|---|
| DE | 10 2008 020 489 A1 | | 10/2009 | |
| DE | 102008020489 A1 * | | 10/2009 | ............. B23Q 7/043 |

(Continued)

OTHER PUBLICATIONS

VoortmanMachinery, "Voortman V505-160T—fast servo driven gripper truck", Sep. 23, 2015, https://www.youtube.com/watch?v=shLn5X1tvN4, accessed Sep. 25, 2023 (Year: 2015).*

(Continued)

*Primary Examiner* — Gerald McClain
(74) *Attorney, Agent, or Firm* — Birch, Stewart, Kolasch & Birch, LLP (57) ABSTRACT

A gripper truck assembly for moving a workpiece with respect to a machining station includes a gripper truck, a gripper arm extending from a proximal end connected to the gripper truck to an opposite distal end, a gripper including at least one jaw moveable between a closed position for gripping the workpiece and an open position for releasing the workpiece. The gripper is connected to the distal end of the gripper arm by a joint configured to permit a rotation of the gripper, a hydraulic gripper actuator accommodated in the gripper arm and operatively connected to the gripper for actuating the at least one jaw of the gripper between the open position and the closed position, a gripper rotation actuator for actuating the rotation of the gripper with respect to the gripper arm about the gripper rotation axis.

16 Claims, 5 Drawing Sheets

(58) Field of Classification Search
 USPC .......................................................... 414/16
 See application file for complete search history.

(56) References Cited

FOREIGN PATENT DOCUMENTS

| EP | 1 516 696 A1 | 3/2005 | |
| EP | 1516696 A1 * | 3/2005 | ............. B23B 13/02 |
| WO | WO 2020/185071 A1 | 9/2020 | |

OTHER PUBLICATIONS

Dutch Search Report, issued in Priority Application No. 2028614, dated Mar. 23, 2022.
VoortmanMachinery: "Voortman V505-160T—fast servo driven gripper truck". You Tube, Sep. 22, 2015, XP054979948, URL: https://www.youtube.com/watch?v=shLn5X1tvN4&list=PLt_znRExDZltk8hVEvqt2HmZlwlIFKHZs&index=2.

* cited by examiner

GRIPPER TRUCK ASSEMBLY, MACHINING SYSTEM, AND METHOD OF MOVING A WORKPIECE WITH RESPECT TO A MACHINING STATION

FIELD

The invention generally relates to a gripper truck assembly for moving a workpiece with respect to a machining station, as well as to a machining system, and to a method of moving a workpiece with respect to a machining station.

BACKGROUND

Gripper truck assemblies are known for moving a workpiece, such as an elongate steel workpiece, with respect to a machining station. Such moving enables that the workpiece is machined by a stationary machining station at various desired positions along the workpiece. In particular, the workpiece is generally moved over a roller conveyor or similar supporting structure which traverses the machining station in a main transport direction and which supports the workpiece so as to be movable in the main transport direction.

A known gripper truck assembly comprises a gripper truck including a drive unit for driving the gripper truck with respect to the machining station along the main transport direction, and a gripper which is configured for gripping the workpiece so that a gripped workpiece is moved along with the gripper truck. The gripper truck is for example drivable along a track which extends parallel to the roller conveyor on which the workpiece is supported, wherein the gripper is suspended from the gripper truck to be positioned above the roller conveyor. To enable effective gripping of various shapes and sizes of workpieces, a position of the gripper is preferably adjustable with respect to the gripper truck.

For accurate and fast machining, a known machining station is provided with a clamping mechanism for fixating the workpiece at the machining station after the workpiece has been moved into a desired position by the gripper truck assembly. When active, the clamping mechanism fixates the workpiece by constricting a passage for the workpiece along a predetermined constriction length along the main transport direction to a constriction width which corresponds to a width of the workpiece. In a particularly economic machining station, the constriction length is a fixed length, wherein a machining position of the machining station is arranged centrally with respect to the fixed constriction length.

A disadvantage of the fixed constriction length is that the known gripper truck assembly must remain outside the constriction length during the clamping, at least when the workpiece has a small width compared to the gripper truck assembly. As a result, end sections of the workpiece cannot be machined by the machining station while the gripper truck assembly continues to grip the workpiece.

SUMMARY

An object of the present invention is to overcome the above mentioned disadvantage while maintaining the above mentioned advantages. An object is to provide a versatile gripper truck assembly with improved usability in combination with machining station clamping mechanisms with fixed constriction lengths. An object is to enable accurate and fast machining of elongate workpieces along substantially their entire length.

To that end, a first aspect of the invention provides a gripper truck assembly for moving a workpiece with respect to a machining station. The gripper truck assembly comprises a gripper truck including a drive unit for driving the gripper truck with respect to the machining station along a main transport direction. The gripper truck assembly further comprises a gripper arm extending along a gripper arm length of at least 2000 mm in the main transport direction from a proximal end, which is connected to the gripper truck, to an opposite distal end. The gripper arm has a width and a height when viewed in the main transport direction, the width being less than 150 mm.

Preferably, the width is less than 140 mm, more preferably less than 130 mm, more preferably less than 120 mm, more preferably less than 110 mm, more preferably less than 100 mm, more preferably less than 90 mm, more preferably less than 80, for example about 70 mm or less.

The gripper truck assembly further comprises a gripper comprising at least one jaw which is configured to be moveable between a closed position for gripping the workpiece and an open position for releasing the workpiece. The gripper is connected to the distal end of the gripper arm by a joint which is configured to permit a rotation of the gripper with respect to the distal end of the gripper arm about a gripper rotation axis which is substantially parallel to the main transport direction.

The gripper truck assembly further comprises a hydraulic gripper actuator accommodated in the gripper arm and operatively connected to the gripper for actuating the at least one jaw of the gripper between the open position and the closed position for selectively gripping or releasing the workpiece.

The gripper truck assembly further comprises a gripper rotation actuator which is operatively connected to the joint for actuating the rotation of the gripper with respect to the gripper arm about the gripper rotation axis.

Advantageously, the relatively large length and small width of the gripper arm enable that the gripper truck assembly can grip a workpiece which has a relatively small width, while a gripped end of the workpiece is positioned centrally with respect to a constriction length of a clamping mechanism of the machining station. In this way, substantially any section of the elongate workpiece may be machined at the machining position of the machining station, as desired, in particular while the workpiece remains gripped by the gripper of the gripper truck assembly.

The joint which rotatably connects the gripper to the distal end of the gripper arm can provide a desired versatility of the gripper in terms of adjustability of its gripping position or orientation, wherein the gripper rotation actuator can advantageously effect a corresponding rotational adjustment of the gripper, as desired.

The relatively long gripper arm can be sufficiently stiff in a vertical direction, in particular due to its height being allowed to be relatively large, for example larger than its width. Meanwhile, since the joint is arranged at the distal end of the gripper arm, the gripper arm can be particularly stiffly connected to the gripper truck. Thus the gripper arm can be suspended from the gripper truck in a particularly stable way, thereby enabling accurate positioning of the gripper.

By accommodating the hydraulic gripper actuator in the gripper arm, for example at a distal end thereof, an actuation path from the hydraulic gripper actuator to the gripper can be relatively short, to enable sufficiently forceful and stable gripping.

The gripper truck assembly is thus relatively versatile, in particular with improved usability in combination with machining station clamping mechanism with fixed constriction lengths. The gripper truck assembly is also relatively reliable, durable and economic compared to one or more known gripper truck assemblies.

A further aspect provides a machining system comprising a machining station and a gripper truck assembly as described herein for moving a workpiece with respect to the machining station.

Such a machining system provides above mentioned advantages.

The machining station of the machining system may comprise a clamping mechanism for clamping the workpiece, wherein the clamping mechanism may be configured to impose a corresponding constriction to a width of the workpiece, the constriction having a fixed length along the transport direction, for example a length of at least 50 cm.

Such a machining station is known as such and is advantageously relatively economic. The present combination with the improved gripper truck assembly advantageously provides, as explained, that the machining system can nevertheless perform machining at end sections of elongate workpieces.

A further aspect provides a method of moving a workpiece with respect to a machining station. The method comprises: providing a gripper truck assembly as described herein at a machining station. The method further comprises, using the gripper rotation actuator, rotating the gripper with respect to the gripper arm to align the gripper with a grippable section of the workpiece. The method further comprises: using the hydraulic gripper actuator, causing the aligned gripper to grip the grippable section of the workpiece; and, using the drive unit of the gripper truck, driving the gripper truck with respect to the machining station, while maintaining the gripping, thereby moving the workpiece with respect to the machining station.

Such a method provides above mentioned advantages.

Further advantageous elaborations of the invention are provided by the features of the dependent claims, as will be explained further in the following detailed description.

DETAILED DESCRIPTION

In the following, the invention will be explained further using exemplary embodiments and drawings. The drawings are schematic and merely show examples. In the drawings, corresponding elements have been indicated with corresponding reference signs. In the drawings.

Figure 1:
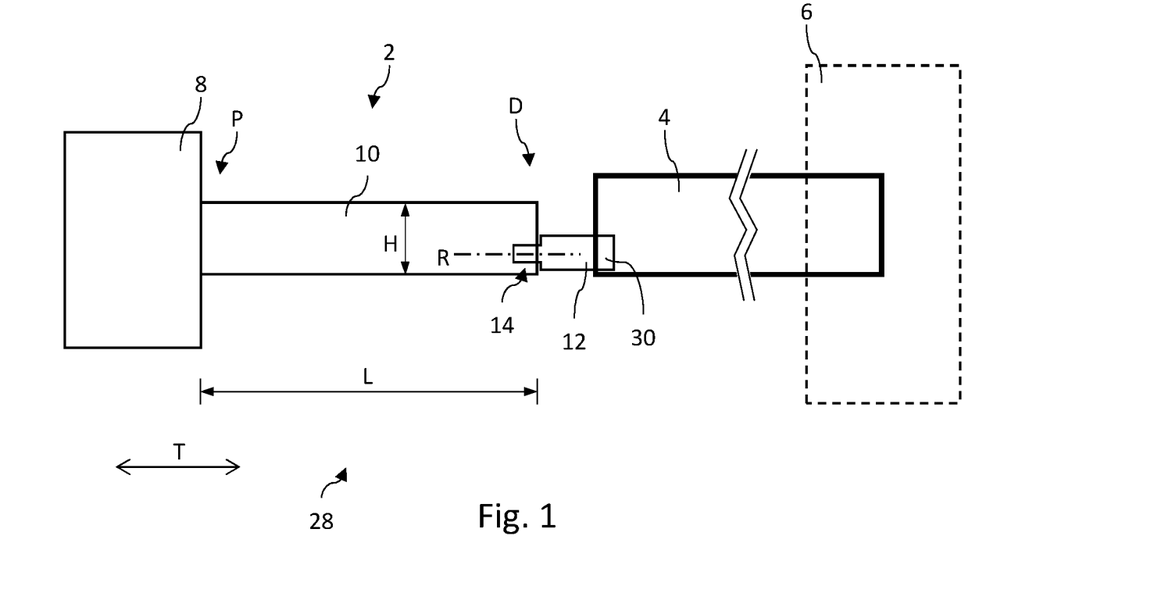
FIG. 1 shows a side view of a machining system comprising a gripper truck assembly.
Figure 2:
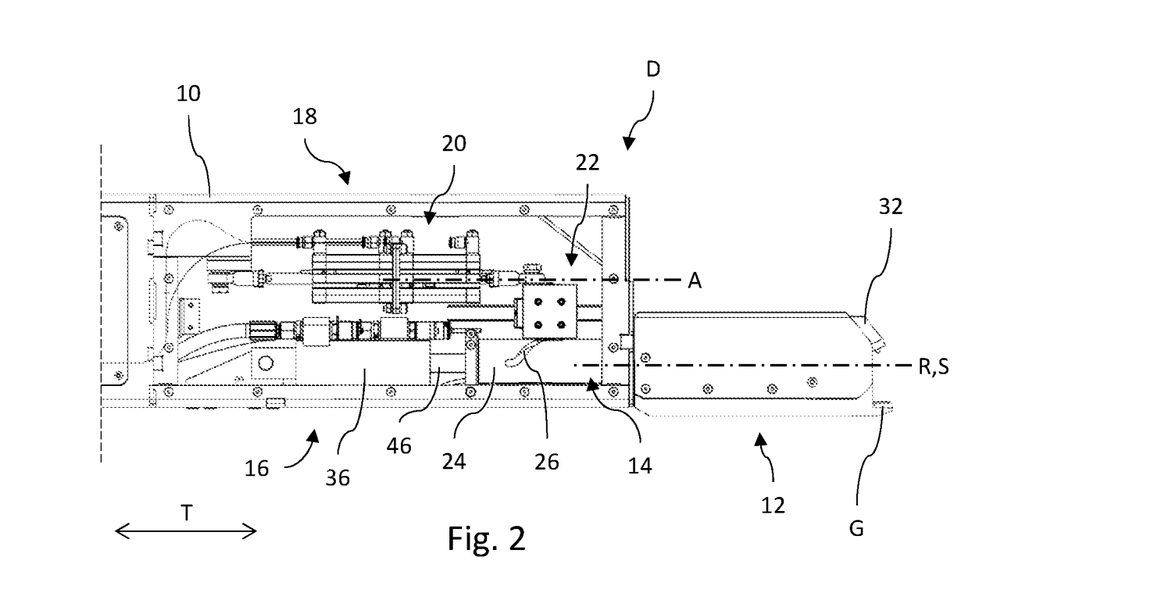
FIG. 2 shows a side view of a distal end section of a gripper arm with a gripper, wherein a cover part of the gripper arm has been removed.
Figure 8A:
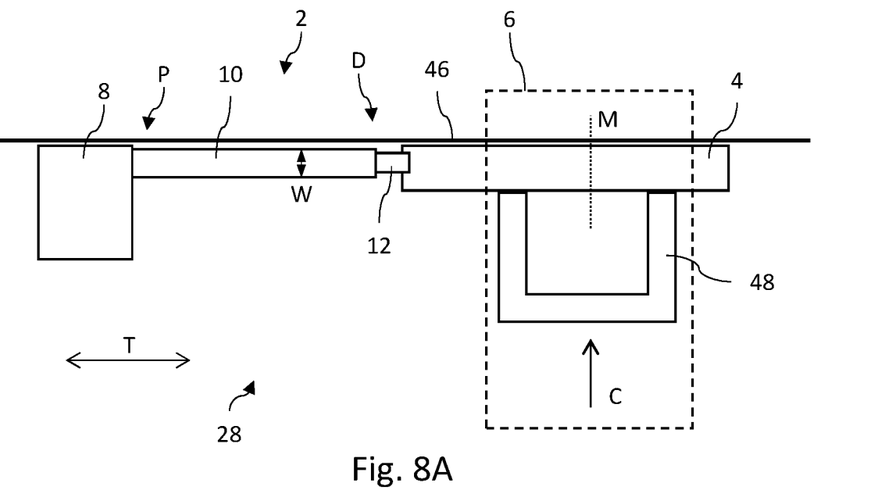
FIG. 8A shows a top view of an exemplary machining system comprising a gripper truck assembly, wherein a workpiece is at a first position with respect to a machining station of the machining system.
Figure 8B:
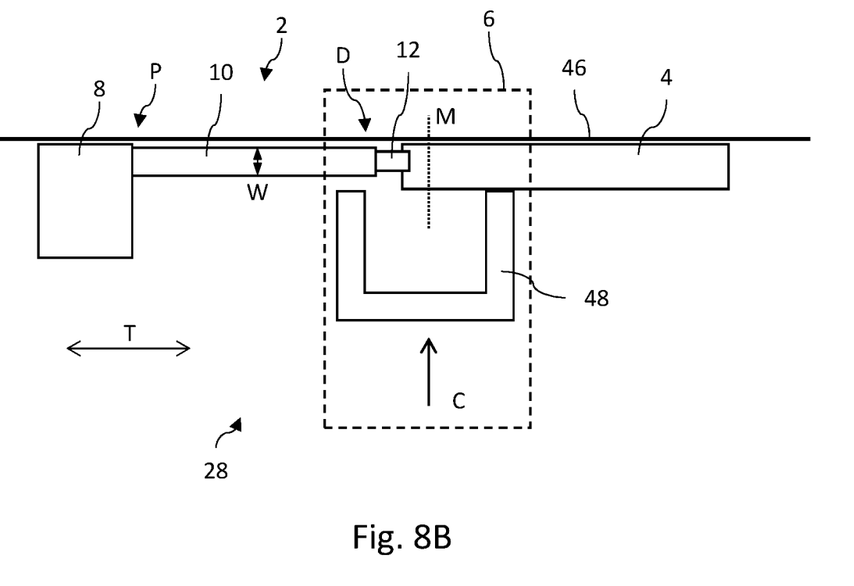
FIG. 8B shows a top view of the machining system of FIG. 8A, wherein the workpiece is at a second position with respect to the machining station.

The drawings show examples of a gripper truck assembly 2, at least parts thereof, for moving a workpiece 4 with respect to a machining station 6. FIGS. 1, 8A and 8B show examples of such a workpiece 4 and machining station 6, as well as showing examples of a machining system 28 which comprises the machining station 6 and the gripper truck assembly 2. The workpiece 4, for example an elongate steel workpiece, can be machined, for example cut or drilled, by the machining station 6, in particular at a machining position M of the machining station 6 (see FIGS. 8A-B).

Figure 3A:
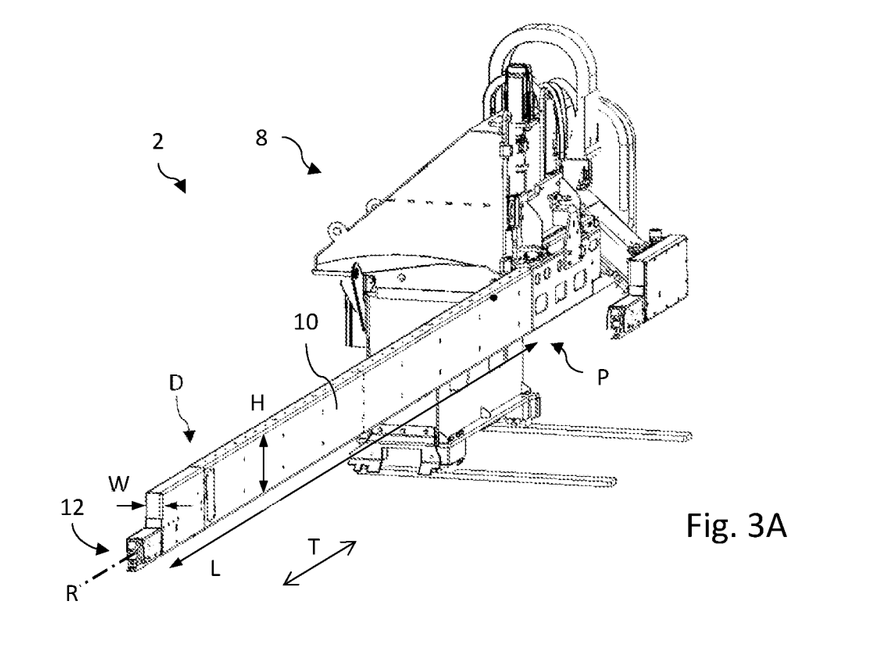
FIG. 3A shows an isometric view of a gripper truck assembly comprising the gripper arm with gripper of FIG. 2.
Figure 3B:
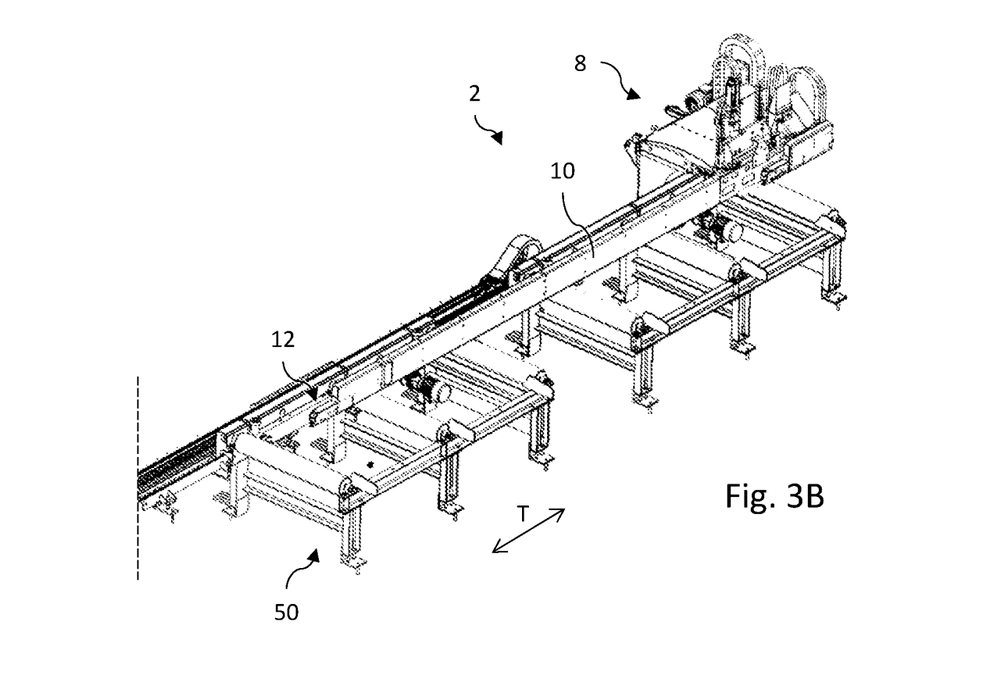
FIG. 3B shows an isometric view of the gripper truck assembly of FIG. 3A, positioned along a roller conveyor.

The gripper truck assembly 2 comprises a gripper truck 8 including a drive unit for driving the gripper truck 8 with respect to the machining station 6 along a main transport direction T. The gripper truck 8 with drive unit can be of a type which is known as such. The drive unit can be realized in various ways, for example being configured to drive the gripper truck 8 along a suitable track which extends in the main transport direction T, for example parallel to a roller conveyor 50 (see FIG. 3B) on which the workpiece 4 is normally received.

The gripper truck assembly 2 further comprises a gripper arm 10. The gripper arm 10 extends along a gripper arm length L of at least 2000 mm in the main transport direction T from a proximal end P, which is connected to the gripper truck 8, to an opposite distal end D.

In an embodiment, the gripper arm length L is at least 3000 mm, in particular at least 4000 mm, for example about 5 m.

The gripper arm 10 has a width W and a height H when viewed in the main transport direction T. The width W is less than 150 mm, preferably less than 100 mm, more preferably less than 80 mm, for example about 70 mm. The height H is preferably more than the width W, more preferably at least twice as large as the width W, more preferably at least three times as large as the width W, for example about 3.5 times the width W. Accordingly, the height H may be at least 10 cm, in particular at least 15 cm, more in particular at least 25 cm, for example about 25 cm.

The gripper truck assembly 2 comprises a gripper 12 comprising at least one jaw 32 which is configured to be moveable between a closed position for gripping the workpiece 4 and an open position for releasing the workpiece 4. FIGS. 2, 4 and 5A-B show the at least one, here one, jaw 32 in the open position, in particular at a distance from a gripping position G of the gripper 12. Here, the gripping position G is defined by a counter face for the jaw 32, which counter face is here substantially fixed with respect to the gripper 12 as part of a main body of the gripper 12. In the closed position, the jaw 32 reaches the gripping position G so that the workpiece 4 can be gripped, or clamped, there between the jaw 32 and the aforementioned counter face. In an example of an alternative gripper, a gripping position may be defined as a position where two oppositely moveable jaws meet in their closed positions.

The gripper 12 is connected to the distal end D of the gripper arm by a joint 14 which is configured to permit a rotation of the gripper 12 with respect to the distal end D of the gripper arm 10 about a gripper rotation axis R which is substantially parallel to the main transport direction T.

In the shown examples, the joint 14 comprises a structure which is fixed to a main body of the gripper 12, for example as an integral part thereof or otherwise, and which extends in the gripper arm 10 at the distal end D, in particular such that a mechanical connection between the gripper 12 and the gripper arm 10 is thereby maintained, while normally permitting rotary articulation about the gripper rotation axis R.

The gripper truck assembly 2 comprises a hydraulic gripper actuator 16 accommodated in the gripper arm 10 and operatively connected to the gripper 12 for actuating the at least one jaw 32 of the gripper 12 between the open position and the closed position for selectively gripping or releasing the workpiece 4.

In the shown examples, the hydraulic gripper actuator 16 comprises a hydraulic cylinder 36 (see FIGS. 2, 4, 6) with a piston 46 (see FIGS. 2, 6) which is coupled to the jaw 32 for actuation thereof.

The gripper truck assembly 2 comprises a gripper rotation actuator 18 which is operatively connected to the joint 14 for actuating the rotation of the gripper 12 with respect to the gripper arm 10 about the gripper rotation axis R.

Figure 7:
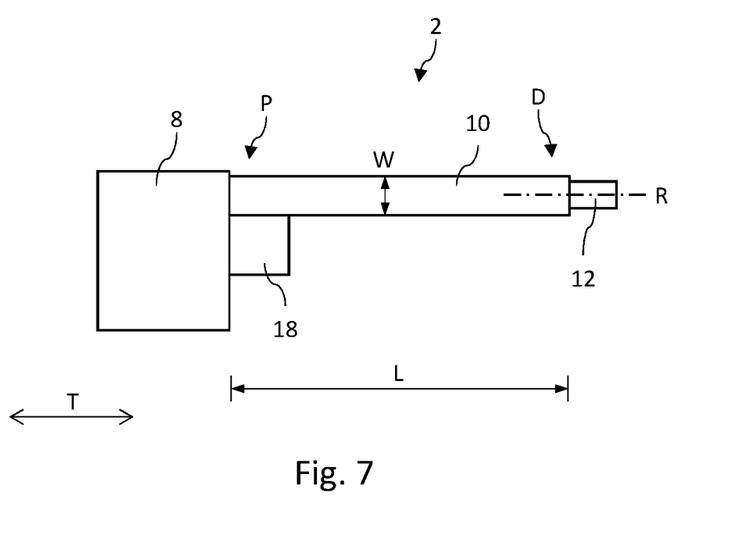
FIG. 7 shows a top view of a further exemplary gripper truck assembly.

In an embodiment, as shown schematically in FIG. 7, the gripper rotation actuator 18 is accommodated at the proximal end P of the gripper arm 10.

By accommodating the gripper rotation actuator 18 at the proximal end P, the gripper arm 10 can reach relatively far into a narrow passage, for example associated with a clamping mechanism 48 at a machining station 6, in particular nearly as far as the length L of the gripper arm 10. A drive shaft or similar connecting element may extend through the gripper arm 10 to couple the gripper rotation actuator 18 at the proximal end P to the joint 14 at the distal end D.

In a particularly preferred embodiment, as shown in FIGS. 2, 4-6, the gripper rotation actuator 18 is accommodated in the gripper arm 10.

In this way, the gripper rotation actuator 18 does not affect at all how far the gripper arm 10 can reach into such a narrow passage.

In an embodiment, the gripper rotation actuator 18 is accommodated at the distal end D of the gripper arm 10.

Advantageously, a relatively short actuation path can thus be realized between the gripper rotation actuator 18 and the joint 14 for rotation of the gripper 12.

In an embodiment, the gripper rotation actuator 18 comprises a linear actuator 20 having an actuation axis A (see FIG. 2) substantially parallel to the main transport direction T and/or substantially parallel to the gripper rotation axis R.

Figures 4, 5A, 5B:
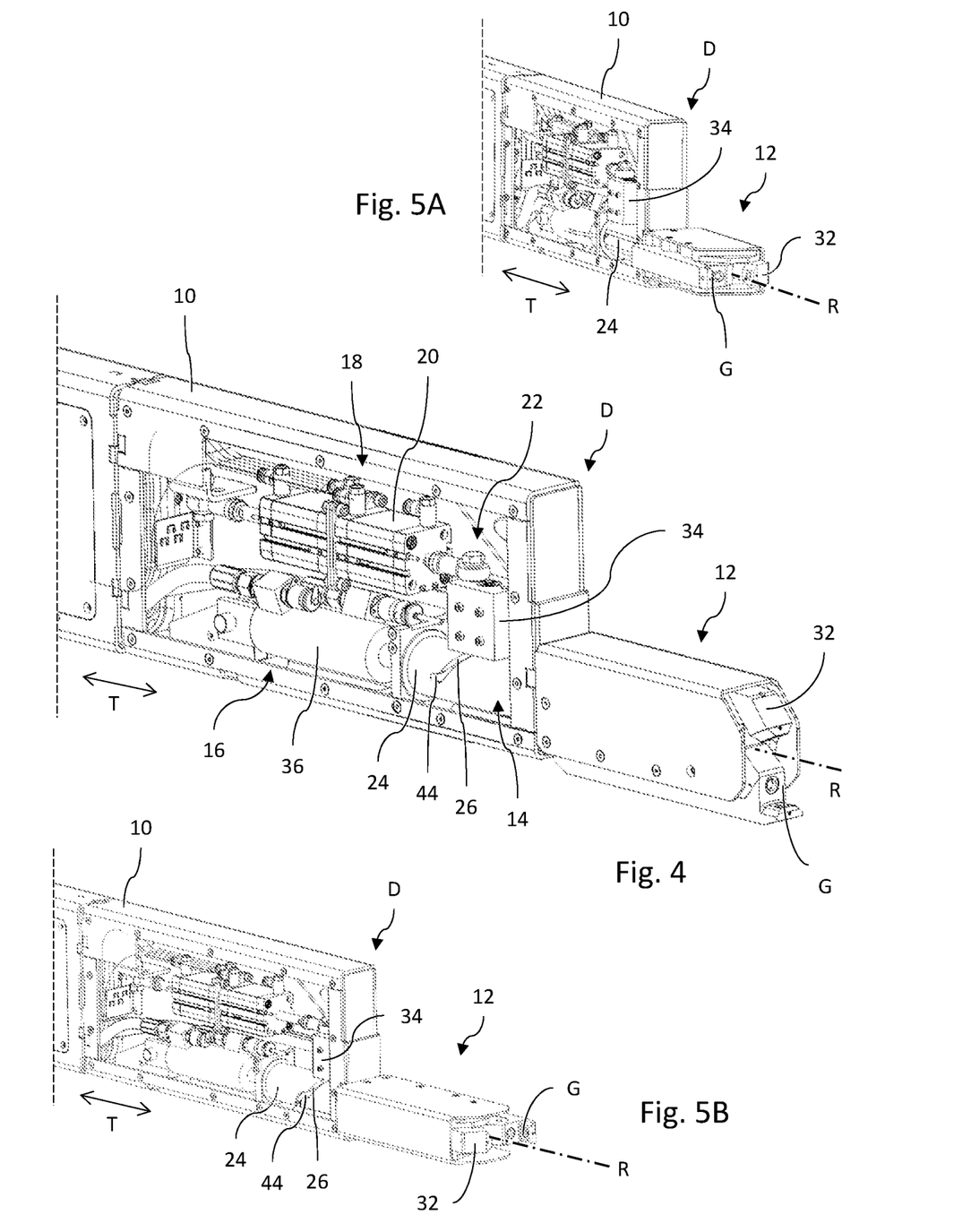
FIG. 4 shows an isometric view of the distal end section of the gripper arm with gripper, wherein a cover part of the gripper arm has been removed.
FIGS. 5A and 5B show isometric views of the gripper arm with gripper of FIG. 4, wherein the gripper has been positioned in different rotational positions compared to FIG. 4.

FIGS. 4, 5A and 5B show the gripper 12 in three mutually different rotational positions about the gripper rotation axis R. The shown rotational positions here differ by about 90 degrees or a multiple thereof.

It can be seen that, correspondingly, the gripper rotation actuator 18 is in three mutually different states, ranging from a fully contracted state in FIG. 5A, via an intermediate state in FIG. 4, to a fully extended state in FIG. 5B.

In an embodiment, the gripper rotation actuator 18 comprises a conversion mechanism 22 for converting a translational actuation by the linear actuator 20 to a rotation of the joint 14 with respect to the gripper arm 10 about the gripper rotation axis R.

In an embodiment, the conversion mechanism 22 comprises a shaft 24 having a shaft axis S substantially parallel to the main transport direction T, wherein the shaft 24 is fixedly connected to the joint 14, wherein the shaft 24 is provided with a substantially helical guiding track 26 which is engaged by the linear actuator 20. The shaft 24 can have a substantially cylindrical shape, with the helical guiding track 26 extending along a cylindrical surface of the shaft 24, for example as a substantially helical groove in a cylindrical wall.

Such a configuration can provide a particularly compact yet effective gripper rotation actuator 18, in particular so as to fit within the gripper arm 10 having a relatively small width W.

In the shown examples, the helical guiding track 26 of the shaft 24 is engaged by a coupling element 34 which is connected to a moveable piston of the linear actuator 20. To effect the coupling, the coupling element 34 may comprise a cam which engagingly extends into the guiding track 26. The coupling element 34 may be slidably mounted on a respective guide 40 which extends parallel to the actuation axis A.

In an embodiment, the shaft 24 is hollow, having a central passage which extends through the shaft 24 in the main transport direction T, wherein a drive shaft of the hydraulic gripper actuator 16 extends through the central passage of the shaft 24 and is connected to the gripper 12.

Figure 6:
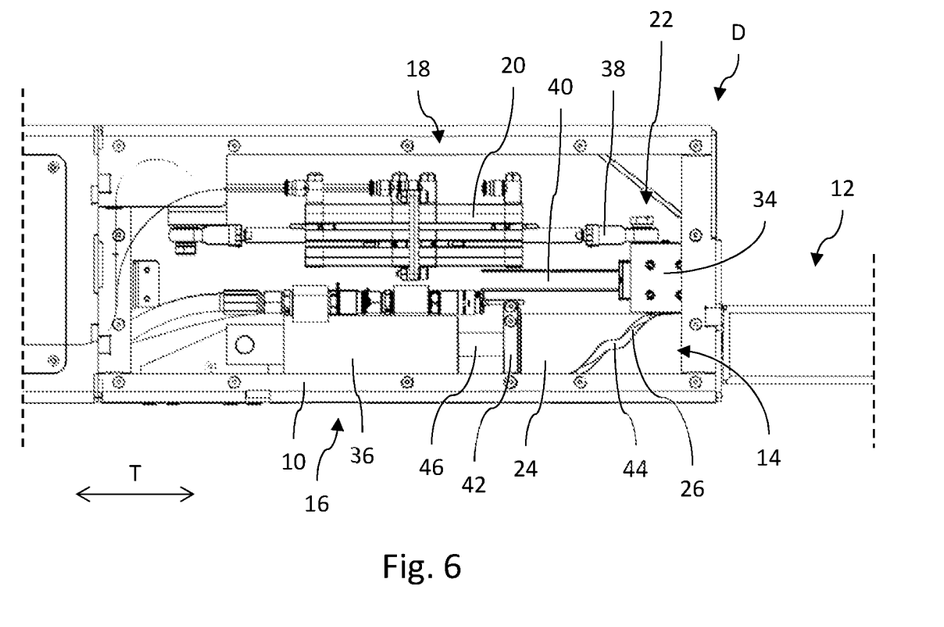
FIG. 6 shows a side view of the distal end section of the gripper arm with the gripper in the rotational position of FIG. 5B.

For example, with reference to FIG. 6, a piston 46 of the hydraulic gripper actuator 16 may extend as part of a drive shaft into the hollow shaft 24.

In this way, the at least one jaw 32 of the gripper 12 can be actuated substantially irrespective of a rotational position of the gripper 12 about the gripper rotation axis R, while the overall configuration can remain particularly compact so as not to exceed the width W of the gripper arm 10.

In an embodiment, the gripper rotation actuator 18 comprises a rotary motor and a gear transmission with an inlet shaft which is driven by the rotary motor and an outlet shaft which is fixedly connected to the joint 14 and extends at least partially through the gripper arm 10.

Such an alternative gripper rotation actuator 18 may for example be arranged at the proximal end P of the gripper arm 10, as shown in FIG. 7, or elsewhere, such as at the distal end D of the gripper arm 10, then preferably in the gripper arm 10. Details of the optional rotary motor and gear transmission are not explicitly shown in the drawings, however the skilled person having the benefit of the present description and drawings will readily understand how to apply this option.

In an embodiment, the gear transmission comprises a substantially ring-shaped gear with a central opening, wherein an operative connection between the hydraulic gripper actuator 16 and the gripper 12 extends through the central opening of the ring-shaped gear.

Such a central opening in a ring-shaped gear can provide similar advantages compared to the above described passage in the hollow shaft 24. Accordingly, such a ring-shaped gear may be arranged concentric with the gripper rotation axis R, for example at the joint 14.

In an embodiment, the hydraulic gripper actuator 16 is configured to temporarily fixate a rotational position of the joint 14, and thereby the gripper 12, with respect to the gripper arm 10, while the hydraulic gripper actuator 16 actuates the at least one jaw 32 of the gripper 12 to be in the closed position.

In this way, the workpiece 4 can be gripped particularly reliably and stably by the gripper 12, in particular without any rotational instability of the gripper 12 with respect to the gripper arm 10 and without continued actuation by the gripper rotation actuator 18.

In an embodiment, the shaft 24 is pushed into a bearing 42 when the hydraulic gripper actuator 16 is actuated and the at least one jaw 32 of the gripper 12 is in the closed position, so as to fixate the rotational position of the joint 14 and remove any play between the joint 14 and the gripper arm 10.

FIG. 6 shows one bearing 42 for the shaft 24, wherein a further bearing is provided at an opposite end of the shaft 24, here obscured by a housing of the arm 10. The shaft 24 can in particular be pushed into this latter bearing, i.e. being pushed in the direction of the distal end D of the gripper arm 10.

In an embodiment, the gripper rotation actuator 18 is provided with one or more indexing structures 44 for stably maintaining a rotational position of the gripper 12, in particular the joint 14, with respect to the gripper arm 10 at a respective indexed rotational position without continued actuation by the gripper rotation actuator 18.

FIG. 6 shows one example of such an indexing structure 44 in the form of a non-helical section of the substantially helical track 26. The non-helical section in particular extends parallel to the gripper rotation axis R or substantially in the main transport direction T. Such indexing structures 44 may be provided at various positions along the substantially helical track 26, in particular at angular intervals which correspond to desired rotational indexing positions of the gripper 12, for example at intervals of about 90 degrees. During use, a cam of the coupling element 34 of the gripper rotation actuator 18 may be positioned in such an indexing structure 44, whereby a corresponding rotational position of the gripper 12 can be stably maintained.

In an embodiment, the gripper 12 is configured to grip the workpiece 4 at a gripping position G of the gripper 12 which gripping position G is offset from the gripper rotation axis R so as to vary in dependence of the rotational position of the gripper 12 with respect to the gripper arm 10.

For example, FIGS. 4, 5A and 5B show the gripping position G as varying, in particular with respect to the gripper arm 10, in dependence of the rotational position of the gripper 12. It can be seen that also a gripping orientation can thus be varied, in particular to selectively accommodate gripping of either a vertical or horizontal section of the workpiece 4, as desired.

Such a selectively variable gripping position G and/or orientation can advantageously provide even greater versatility in use of the gripper truck assembly 2, wherein in particular various shapes and sizes of workpieces 4 can be gripped effectively by the gripper truck assembly 2 for movement of the workpiece 4 with respect to a machining station.

With reference to FIGS. 8A and 8B, the machining station 6, which generally has a stationary position along the transport direction, may comprise a clamping mechanism 48 which is configured to constrict a passage for the workpiece 4, in particular so as to clamp the workpiece 4 against a datum line 46. Accordingly, to clamp the workpiece 4, the clamping mechanism 48 may be moved in a clamping direction C towards the datum line 46, after the workpiece 4 has been positioned along the transport direction T by the gripper truck assembly 2. A machining position M of the machining station 6 may be arranged centrally with respect to a fixed clamping length of the clamping mechanism along the transport direction. As can be seen in FIG. 8B, the relatively narrow width W of the gripper arm 10 enables that the workpiece 4 is machined by the machining station 6 at virtually any position along its length, in particular also near its longitudinal ends.

A method of moving a workpiece 4 with respect to a machining station 6 comprises: providing a gripper truck assembly 2 as described herein at a machining station 6; using the gripper rotation actuator 18, rotating the gripper 12 with respect to the gripper arm 10 to align the gripper 12 with a grippable section 30 of the workpiece 4; using the hydraulic gripper actuator 16, causing the aligned gripper 12 to grip the grippable section 30 of the workpiece 4; and, while maintaining the gripping, driving the gripper truck 8 with respect to the machining station 6 using the drive unit of the gripper truck 8, thereby moving the workpiece 4 with respect to the machining station 6.

While the invention has been explained herein using exemplary embodiments and drawings, these do not limit the scope of the invention as defined by the claims. Many variations, combinations and extensions are possible within said scope, as will be clear to the skilled person. For example, the gripper rotation actuator may comprise one or more cylinders with pistons which are directed transverse to the transport direction, in particular when the gripper rotation actuator is arranged at the proximal end of the gripper arm. A gear transmission of the gripper rotation actuator may comprise one or more of: one or more gears (for example including one or more conical gears), one or more worms, one or more belts, one or more chains, and one or more associated shafts. The gripper rotation actuator may comprise one or more of: an inductive motor, a slip ring motor, a stepper, a motor encoder mechanism, and a Maltese cross mechanism.

The invention claimed is:

1. A gripper truck assembly for moving a workpiece with respect to a machining station, comprising:
   a gripper truck including a drive unit for driving the gripper truck with respect to the machining station along a main transport direction;
   a gripper arm extending along a gripper arm length of at least 2000 mm in the main transport direction from a proximal end of the gripper arm to an opposite distal end of the gripper arm, the gripper arm being fixedly connected to the gripper truck at the proximal end of the gripper arm, the gripper arm having a width and a height when viewed in the main transport direction, the width being less than 150 mm;
   a gripper comprising at least one jaw configured to be moveable between a closed position for gripping the workpiece and an open position for releasing the workpiece, the gripper being arranged at the distal end of the gripper arm to be spaced apart from the gripper truck by the gripper arm length of at least 2000 mm, wherein the gripper is connected to the distal end of the gripper arm by a joint configured to permit a rotation of the gripper with respect to the distal end of the gripper arm about a gripper rotation axis substantially parallel to the main transport direction while the gripper arm remains fixedly connected to the gripper truck;
   a hydraulic gripper actuator accommodated within the gripper arm and operatively connected to the gripper for actuating the at least one jaw of the gripper between the open position and the closed position for selectively gripping or releasing the workpiece; and
   a gripper rotation actuator operatively connected to the joint for actuating the rotation of the gripper with respect to the distal end of the gripper arm about the gripper rotation axis.

2. The gripper truck assembly according to claim 1, wherein the gripper rotation actuator is accommodated at the proximal end of the gripper arm.

3. The gripper truck assembly according to claim 1, wherein the gripper rotation actuator is accommodated within the gripper arm.

4. The gripper truck assembly according to claim 3, wherein the gripper rotation actuator is accommodated at the distal end of the gripper arm.

5. The gripper truck assembly according to claim 1, wherein the gripper rotation actuator comprises:
   a linear actuator having an actuation axis substantially parallel to the main transport direction; and
   a conversion mechanism for converting a translational actuation by the linear actuator to a rotation of the joint with respect to the gripper arm about the gripper rotation axis.

6. The gripper truck assembly according to claim 5, wherein the conversion mechanism comprises a shaft having a shaft axis substantially parallel to the main transport direction, wherein the shaft is fixedly connected to the joint, and wherein the shaft is provided with a substantially helical guiding track engaged by the linear actuator.

7. The gripper truck assembly according to claim 6, wherein the shaft is hollow, having a central passage extending through the shaft in the main transport direction, wherein a drive shaft of the hydraulic gripper actuator extends through the central passage of the shaft and is connected to the gripper.

8. The gripper truck assembly according to claim 6, wherein the hydraulic gripper actuator is configured to temporarily fixate a rotational position of the joint with respect to the gripper arm while the hydraulic gripper actuator actuates the at least one jaw of the gripper to be in the closed position, and wherein the shaft is pushed into a bearing when the hydraulic gripper actuator is actuated and the at least one jaw of the gripper is in the closed position, so as to fixate the rotational position of the joint and remove any play between the joint and the gripper arm.

9. The gripper truck assembly according to claim 1, wherein the gripper rotation actuator comprises a rotary motor and a gear transmission with an inlet shaft driven by the rotary motor and an outlet shaft fixedly connected to the joint and extending at least partially through the gripper arm.

10. The gripper truck assembly according to claim 9, wherein the gear transmission comprises a substantially ring-shaped gear with a central opening, wherein an operative connection between the hydraulic gripper actuator and the gripper extends through the central opening of the ring-shaped gear.

11. The gripper truck assembly according to claim 1, wherein the hydraulic gripper actuator is configured to temporarily fixate a rotational position of the joint with respect to the gripper arm while the hydraulic gripper actuator actuates the at least one jaw of the gripper to be in the closed position.

12. The gripper truck assembly according to claim 1, wherein the gripper rotation actuator is provided with one or more indexing structures for stably maintaining a rotational position of the gripper with respect to the gripper arm at a respective indexed rotational position without continued actuation by the gripper rotation actuator.

13. The gripper truck assembly according to claim 1, wherein the gripper is configured to grip the workpiece at a gripping position of the gripper, the gripping position being offset from the gripper rotation axis so as to vary in dependence of the rotational position of the gripper with respect to the gripper arm.

14. The gripper truck assembly according to claim 1, wherein the height is larger than the width.

15. A machining system comprising:
   a machining station; and
   the gripper truck assembly according to claim 1 for moving a workpiece with respect to the machining station.

16. A method of moving a workpiece with respect to a machining station, comprising:
   providing the gripper truck assembly according to claim 1 at the machining station;
   using the gripper rotation actuator, rotating the gripper with respect to the gripper arm to align the gripper with a grippable section of the workpiece;
   using the hydraulic gripper actuator, causing the aligned gripper to grip the grippable section of the workpiece; and
   while maintaining the gripping, driving the gripper truck with respect to the machining station using the drive unit of the gripper truck, thereby moving the workpiece with respect to the machining station.

* * * * *